United States Patent [19]

Forsberg et al.

[11] Patent Number: 4,521,920
[45] Date of Patent: Jun. 4, 1985

[54] METHOD AND AN ARRANGEMENT FOR INCREASING THE DYNAMIC RANGE AT THE INPUT STAGE OF A RECEIVER IN AN OPTICAL FIBRE INFORMATION TRANSMISSION SYSTEM

[75] Inventors: Gunnar Forsberg, Stockholm; Lars Ingre, Huddinge, both of Sweden

[73] Assignee: Telefonaktiebolaget L M Ericsson, Stockholm, Sweden

[21] Appl. No.: 365,504

[22] PCT Filed: Aug. 25, 1981

[86] PCT No.: PCT/SE81/00238
§ 371 Date: Apr. 5, 1982
§ 102(e) Date: Apr. 5, 1982

[87] PCT Pub. No.: WO82/00931
PCT Pub. Date: Mar. 18, 1982

[30] Foreign Application Priority Data
Sep. 1, 1980 [SE] Sweden .............................. 8006098

[51] Int. Cl.³ .............................................. H04B 9/00
[52] U.S. Cl. ................................ 455/619; 250/214 A; 307/311

[58] Field of Search ................ 455/601, 602, 603, 606, 455/607, 608, 612, 617, 619; 307/311; 250/214 R, 214 A, 214 L, 214 DC, 214 AG, 214 P, 214 B, 214 AL; 330/59, 85, 107, 294, 308

[56] References Cited

U.S. PATENT DOCUMENTS 4,100,407  7/1978  Takahashi ...................... 250/214 A
4,218,613  8/1980  Bletz ............................. 250/214 A

*Primary Examiner*—Joseph A. Orsino, Jr.
*Attorney, Agent, or Firm*—Roberts Spiecens & Cohen

[57] ABSTRACT

A method and arrangement in the receiver of an optical fibre information transmission system for increasing the dynamic range in a so-called transimpedance-type input stage. The optical input of the arrangement has a non-amplifying photodiode (3) with two poles or terminals (8,9) e.g. a so-called pin-diode, which is connected by one pole (8) to the input on a high-impedance amplifier (1) with feedback between input and output (7) via a resistance (4). The amplifier output signal is fed back via a signal path, in the form of an integrator (2) connected between the output (7) and the other pole (9) of the photodiode and a capacitance (5) in parallel with the photodiode (3), to the amplifier input.

7 Claims, 4 Drawing Figures

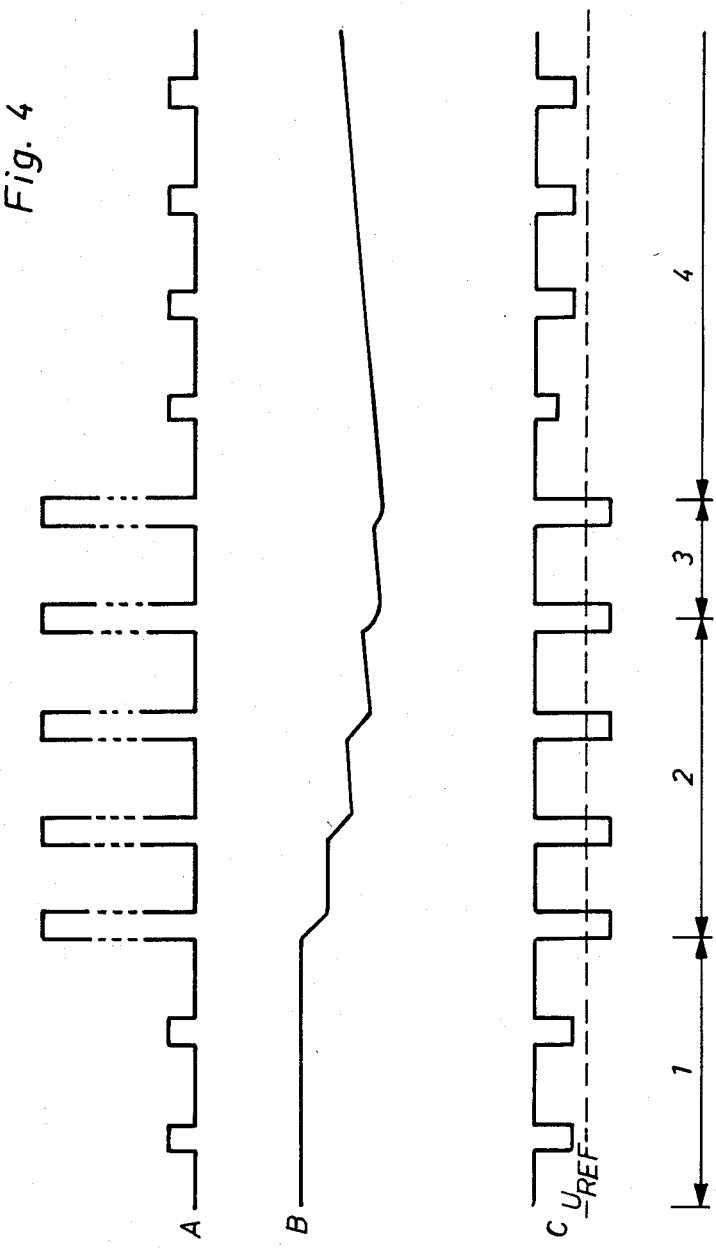

METHOD AND AN ARRANGEMENT FOR INCREASING THE DYNAMIC RANGE AT THE INPUT STAGE OF A RECEIVER IN AN OPTICAL FIBRE INFORMATION TRANSMISSION SYSTEM

TECHNICAL FIELD

The present invention relates to a method and arrangement for increasing the dynamic range at an input stage of a receiver in an optical fibre information transmission system. The input stage is more specifically of the so-called transimpedance type, which is usually used in conjunction with optical fibres.

BACKGROUND ART

In an article in the journal PROCEEDINGS OF THE IEEE, Vol. 65, No 12 December 1977 "Receiver design for optical fibre system" by S. D. Personick, there is given a survey of the state of the art within the area in question. Inter alia, it is apparent from the article that the dynamics of the input stage for a receiver, i.e. the quotient between highest and lowest correctly detected input signal value, can be improved by reducing the value of the transimpedance resistance. However, this technique causes the receiver to have lower sensitivity, which can be a drawback in certain connections.

DISCLOSURE OF THE INVENTION

The technical problem in the case now under discussion resides in increasing the dynamic range for the receiver such that very strong as well as very weak optical signals can be detected correctly without deterioration of sensitivity. The problem is furthermore to do this completely electronically, i.e. without affecting the lumious flux itself.

The limitation of dynamics in a conventional transimpedance stage is caused by the output signal being distorted to an undetectable form when it reaches the same order of magnitude as the voltage feed to the amplifier in the stage.

The present invention provides an increase in the dynamic range by limiting the output signal without the latter being distorted by an unacceptable amount. The invention is furthermore preferably suited to provide fast dynamics, i.e. the receiver can correctly detect digital signal pulses, for example, whose amplitudes vary between extreme values within a very short time interval.

It is assumed the whole time that after the transimpedance stage in the receiver there is a circuit providing detection per se of the signal, and that this circuit manages the detection as long as the signal is not heavily distorted. Such a detector circuit may utilize automatic gain control (AGC), for example, according to known technology. This circuit is outside the scope of the present invention, however.

The solution to the problem, as proposed by the present invention, is characterized as will be seen from the appended claims.

The most essential advantage of the invention is that in some applications it provides with simple means considerably greater dynamics than is possible with known technology.

BRIEF DESCRIPTION OF DRAWINGS

The invention will now be described with the aid of some embodiments, while referring to the accompanying drawing, in which;

FIG. 4 illustrates associated values of some interesting signals in the circuit in accordance with the invention.

MODES FOR CARRYING OUT THE INVENTION

Figure 1:
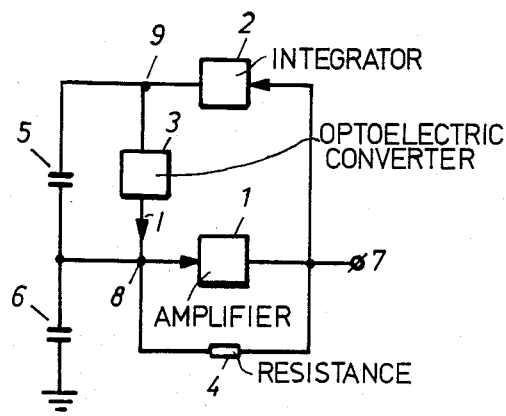
FIG. 1 is an arrangement in accordance with the invention, illustrated in the form of a block diagram.
Figure 2:
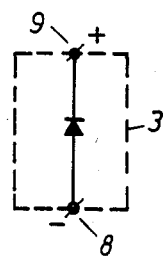
FIG. 2 illustrates an embodiment of the opto-electric converter according to FIG. 1.

An arrangement in accordance with the invention is illustrated in the block diagram of FIG. 1. A current, which is directly proportional to the incident light power, is generated in the opto-electric converter 3. One embodiment of this converter is illustrated in FIG. 2. According to the example, the converter includes a photodiode, which is biassed with a DC voltage having the polarity illustrated. Hereinafter it is assumed that the diode is reverse biassed, which is usually the case in applications of this type. For the sake of simplicity, the generated current I in a direction towards the terminal 8 in FIG. 1 will be regarded as the actual input signal to the input stage.

A capacitor 5 with the capacitance $C_D$ represents the unavoidable parallel capacitance of the converter 3. This capacitance plays a central part in the explanation of the invention's operation.

A high-impedance amplifier 1 is connected to the output from the converter 3 and has a negative amplification $-A$, where $A \gg 1$. For practical reasons, the amplifier is AC-connected, but in calculating the transfer function according to the following, it is regarded as DC-connected, which has no effect on the continued reasoning, here. The capacitor 6 represents the input capacitance of the amplifier 1 with the value $C_{IN}$, which is of the same order of magnitude as $C_D$. The resistance 4 is the so-called transimpedance resistance, and has the value $R_T$. According to known technology, $R_T$ should be very great if a highly sensitive input stage is desired.

According to the invention, an integrator 2 is connected between the output 7 on the amplifier 1 and terminal 9 of the converter 3. The integrator may be partially linear, but in the calculations below it is treated as a linear circuit with the transfer function $A_1/S$, where $A_1$ can be a very large positive number and S is the Laplacian operator. If $A_1$ is put to zero, the capacitor 5 and converter 3 will be AC-grounded at terminal 9, and the circuit functions as a conventional transimpedance stage. For the dynamic range to be increased, the gain $A_1$ must, as will be shown below, be varied either in a dynamically, partially linear mode or in an undynamic linear mode, depending on the embodiment in question. By "dynamic, partially linear" is intended here that $A_1$ varies in response to the input signal to the integrator 2.

In a conventional transimpedance stage, the transfer function will be in ohms, since according to the above the input signal is a current and the output signal a voltage. If the gain A of the amplifier 1 approaches infinity, the transfer function approaches the value $-R_T$.

In order to explain how the invention works it is appropriate to derive the transfer function of the circuit according to FIG. 1.

A plurality of signals are defined below, S denoting the Laplacian operator, as above.

$I(S)$ = the current generated in the converter 3 and defined positive in a direction towards the terminal 8, i.e. the input to the amplifier 1 according to FIG. 1, $U(S)$ = the voltage at terminal 7, i.e. on the output from the amplifier 1, $V(S)$ = the voltage at terminal 8, $I_1(S)$ = the current through the capacitor 5, defined positive in a direction towards terminal 8, $I_2(S)$ = the current through the capacitor 6 defined positive in a direction towards ground, $I_3(S)$ = the current through resistance 4, defined positive in a direction towards terminal 7.

The following equations can be set up with the aid of the previously defined quantities $A$, $A_1$, $R_T$, $C_D$ and $C_{IN}$.

$$U(S) = -A \cdot V(S) \tag{1}$$

$$I_1(S) = \left(\frac{A_1}{S} \cdot U(S) - V(S)\right) S\, C_D \tag{2}$$

$$I_2(S) = V(S) \cdot S\, C_{IN} \tag{3}$$

$$I_3(S) = (V(S) - U(S))/R_T \tag{4}$$

$$I(S) = I_2(S) + I_3(S) - I_1(S) \tag{5}$$

With the aid of the above equations it is easy to show that the transfer function will be $$H(S) = \frac{U(S)}{I(S)} = \frac{-AR_T}{A_1 A R_T C_D + (1 + A) + S R_T (C_D + C_{IN})} \tag{6}$$

To simplify the further analysis, the term $(1+A)$ is approximated to $A$. This is a good approximation since $A \gg 1$. After further reformation of the expression (6) there is obtained:

$$H(S) = \frac{-A \cdot \frac{1}{C_D + C_{IN}}}{S + \frac{A(1 + A_1 R_T C_D)}{R_T(C_D + C_{IN})}} \tag{7}$$

This is the transfer function for a single-pole low-pass filter. If $A_1 = 0$, the expression (7) will be, as previously mentioned, the transfer function for a conventional transimpedance stage.

It will be noted that when $A_1 > 0$, the band width increases in the low-pass filter, which is usually no disadvantage in a transimpedance stage. In order to find out how $H(S)$ behaves within the pass band, $S$ may be put $= 0$.

$$H(0) = \frac{-R_T}{1 + A_1 R_T C_D} \tag{8}$$

The expression (8) clearly shows that variable gain in the transimpedance stage may be enabled by varying the gain $A_1$. This can be done by using a conventional AGC-loop in the circuit, for example. When the amplification $A_1$ is varied, an attenuation is obtained which expressed in dB will be $$20^{10} \log (1 + A_1 R C_D)$$

By increasing the gain $A_1$ the output signal amplitude is thus decreased, which prevents the output signal from being distorted an unacceptable amount for large input signals.

As mentioned above, the integrator 2 can be made as a linear circuit in one embodiment of the invention, and in another embodiment as a partially linear circuit. In the first-mentioned case, the amplifier 1 should be AC-connected, because the light and thereby the current I always contains a DC component since there is no negative light. If the amplifier 1 were DC-connected, this DC component would cause a DC voltage at the terminal 7, which would in turn be integrated in the integrator 2, causing a voltage ramp at the terminal 9, which could eventually reverse the bias of the converter 3. An alternative is to utilize a non-ideal integrator with limited amplification at low frequencies.

Figure 3:
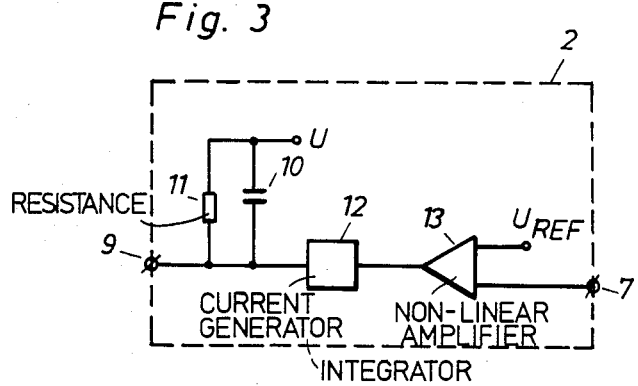
FIG. 3 is an embodiment of the integrator according to FIG. 1.

When the integrator 2 is made as a partially linear circuit, it can have the form illustrated in FIG. 3. In principle, a non-linear voltage-controlled current generator 12, 13 is connected to an integration capacitor 10 in this embodiment. A discharge resistance 11 is connected in parallel across the capacitor 10. The non-linear voltage-controlled current generator has here been shown to be functionally divided into two parts, namely a non-linear amplifier 13 and a linear current generator 12, but can naturally very well be realized in a single component. The non-linear amplifier functions such that when the voltage at the terminal 7 is positive in relation to the reference voltage $U_{REF}$, the amplifier has no, or negligibly small gain. When the voltage becomes more negative than the reference voltage, the gain increases and then suitably in proportion to the voltage difference. This relationship is approximately similar to the differential admittance variation with applied voltage of a diode. In the normal case, i.e. with no, or very weak input signal, the voltage at the terminal 7 is more positive than the reference voltage, and the connection according to FIG. 1 above functions as a conventional transimpedance stage. The capacitor 10 on the output from the current generator 12 gives a non-linear integration of the voltage at the terminal 7. The capacitor will thus be charged for a strong signal at the terminal 7. The resistance 11 in parallel with the capacitor discharges it towards the voltage U. Such a discharge is necessary to enable the reception of a weak input signal after detecting a strong signal. The opto-electric converter 3 namely functions optimally in respect of sensitivity when it is negatively biased. It should be noted that this reasoning is conditional on the capacitor 10 being large enough for the external current to only negligibly affect the voltage at the terminal 9, i.e. the integrator 2 has negligibly low output impedance.

When the input signal to the apparatus is a constant strong signal or a pulse train of strong signals, it would appear at first sight that problems could arise, since the discharge resistance 11 will not have time to discharge the capacitor 10. A voltage ramp will thus occur at the terminal 9. If the opto-electric converter is made according to FIG. 2, such a course of events is however counteracted in the following way.

When the voltage at the terminal 9 becomes more and more negative, the photodiode shunt resistance decreases heavily after a while, in turn resulting in that the converter itself limits the input signal. A large portion of the current generated in the converter in this state is thus shunted and it never arrives at the transimpedance stage. This situation in combination, with the function of the discharge resistance 11, stabilizes the voltage in the terminal 8.

The inventive functional mode with an integrator according to FIG. 3 when the input signal strength varies heavily within a limited time interval, is illustrated by the timing diagram of FIG. 4.

The signal A illustrates the optical input signal or current generated in the opto-electric converter. The two first light pulses are relatively weak, but then the input power increases as a step function, and it is assumed that the five subsequent pulses have, say, 1000 times greater light amplitude. The pulses have been dashed to indicate this assumption. According to the example, there are subsequently four light pulses with the same amplitude as the two first ones.

The signal B illustrates the voltage at the terminal 9. During period 1 of the sequence, the terminal voltage is equal to the voltage U according to FIG. 3. The reason for this is that the integrator 2 has not been activated for some time, thus the discharge resistance 11 has had time to discharge any possible charge from the capacitor 10.

At the beginning of period 2 of the sequence, the input signal power increases as a step function according to the above, and the voltage at the terminal 9, according to curve B, is integrated downwards under the duration of the pulse. The downward integration is due to the voltage at the terminal 7 being less than $U_{REF}$. After the first pulse, the voltage increases slightly before the next pulse comes, due to the discharging sequence in the RC-circuit 10,11. The two subsequent pulses in the signal A cause a repeat of the sequence. On the other hand, the fourth pulse, period 3, gives rise to a somewhat different signal at the terminal 9. The photodiode has now begun to be forward-biased, resulting in that the signal B is limited, due to the greater portion of the generated current being shunted in the photodiode, as explained above. The same thing applies to the next pulse. Subsequently, i.e. in period 4, the voltage increases according to curve B towards the voltage value U according to FIG. 3.

The curve C illustrates the voltage at the terminal 7, i.e. the output signal from the apparatus. The amplitude differences between the pulses in the different periods is relatively small. The first pulse in period 4 has a somewhat lower amplitude, however. This relationship illustrates the fact that the invention with an integrator according to FIG. 3 can correctly detect weak signals closely followed by stronger ones much more easily than vice versa.

The positive ramp in signal B, generated by the discharge in the RC circuit, is actually heavily exaggerated. In practice, this signal must increase considerably more slowly for the signal C not to be affected disadvantageously. FIG. 4 is also heavily simplified in other respects, more clearly to show the principle of the inventive modus operandi. For example, the signal C has been illustrated without rise times in the figure.

What we claim is:

1. A method of increasing the dynamic range in a transimpedance type of input stage in a receiver of an optical fibre information transfer system having as an optical input a two-terminal non-amplifying photodiode with a parallel capacitance with one of the terminals of the photodiode being connected to the input of a high impedance amplifier, said method comprising the steps of integrating the output signal of said high impedance amplifier and feeding the resulting integrated signal to the other terminal of the photodiode and capacitive coupling the integrated signal received at said other terminal to said input of the high impedance amplifier.

2. In a transimpedance type of input stage of a receiver which is part of an optical fibre information transfer system having as an optical input a two-terminaled non-amplifying photodiode with a parallel capacitance, apparatus for increasing the dynamic range of the input stage comprising a high-impedance amplifier with feedbak means having an input and an output, means for connecting said input to one terminal of said photodiode, integrating means for connecting said output to the other terminal of said photodiode and capacitive means capacitively coupling said other terminal to said input of the high-impedance amplifier.

3. The apparatus of claim 2 wherein said integrating means is a non-linear integrator.

4. The apparatus of claim 2 wherein said integrating means is a partially linear integrator.

5. The apparatus of claim 2 wherein the parallel capacitance is the inherent capacitance of the photodiode.

6. The apparatus of claim 5 wherein said integrating means is a non-linear integrator.

7. The apparatus of claim 5 wherein said integrating means is a partially linear integrator.

* * * * *